J. E. DUGGAN.
AUTOMOBILE LOCKING DEVICE.
APPLICATION FILED NOV. 3, 1917.

1,266,432.

Patented May 14, 1918.

WITNESSES

INVENTOR
J. E. Duggan,
BY Victor J. Evans
ATTORNEY

UNITED STATES PATENT OFFICE.

JOHN E. DUGGAN, OF BERKELEY, CALIFORNIA.

AUTOMOBILE-LOCKING DEVICE.

1,266,432.   Specification of Letters Patent.   Patented May 14, 1918.

Application filed November 3, 1917. Serial No. 200,164.

*To all whom it may concern:*

Be it known that I, JOHN E. DUGGAN, a citizen of the United States, residing at Berkeley, in the county of Alameda and State of California, have invented new and useful Improvements in Automobile-Locking Devices, of which the following is a specification.

This invention relates to automobile locking devices, the particular object of the invention being to provide means for locking an automobile or motor vehicle safely upon a steep incline or grade, the said means being reliable and coöperating directly with one of the wheels of the chassis so as to positively prevent said wheels from rotating while engaged by the locking mechanism.

A further object of the invention is to provide means used in conjunction with the wheel locking means above referred to, for also locking the hand controlling wheel by means of which the vehicle is started, the last named means preventing the steering wheels from assuming any other angle than that in which they were left by the operator.

With the above and other objects in view, the invention consists in the novel construction, combination and arrangement of parts, herein described, illustrated and claimed.

In the accompanying drawing:—

Figure 1:
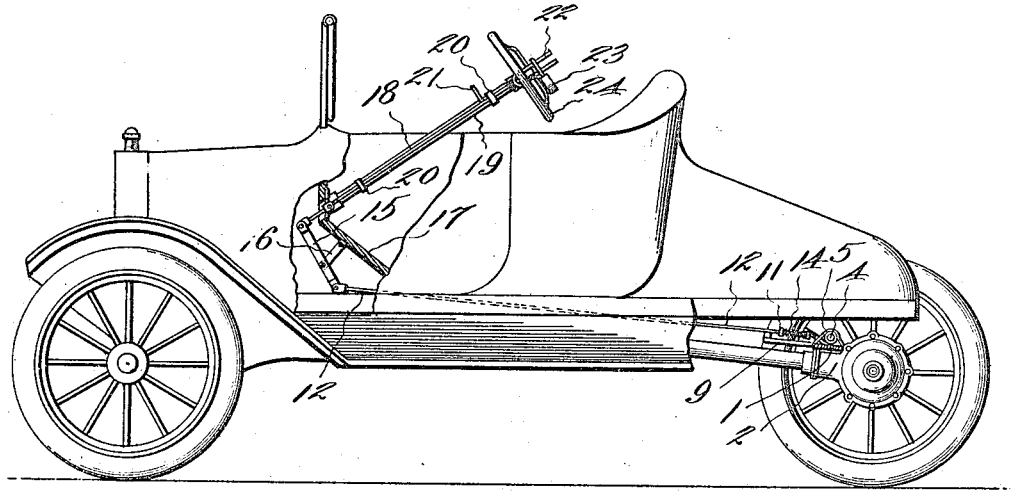
Figure 1 is a vertical longitudinal section through a sufficient portion of a motor vehicle to illustrate the locking mechanism in its applied relation thereto.
Figure 2:
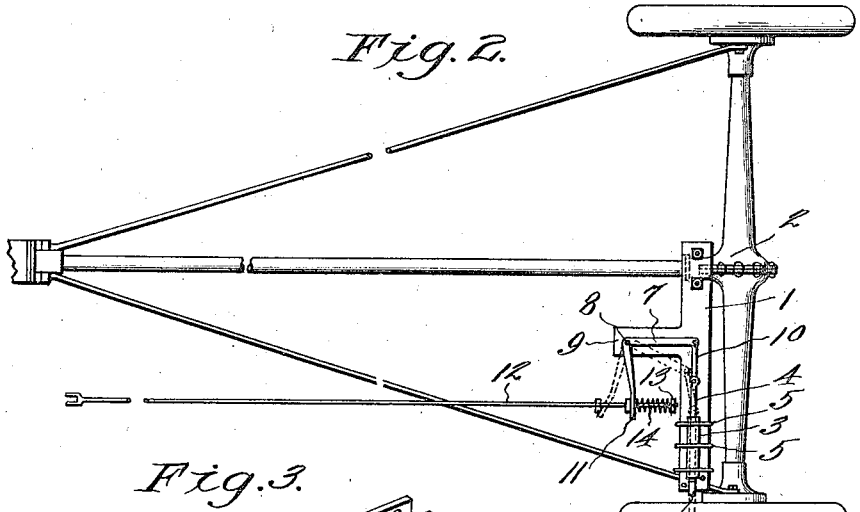
Fig. 2 is a plan view of the rear part of the machine illustrating the relation of a portion of the locking mechanism to the rear axle and one of the wheels thereof.
Figure 3:
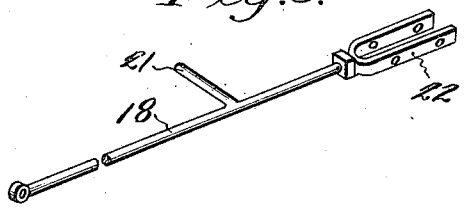
Fig. 3 is a detail perspective view of the hasp.

In carrying out the present invention, in the preferred embodiment thereof, I employ an anchoring or base plate 1 adapted to be secured to the rear axle housing indicated at 2 and extending longitudinally thereof. Secured in fixed relation to the plate 1 and extending longitudinally thereof is a tubular guide or housing 3 in which is mounted a sliding bolt 4. The housing or guide 3 is fastened securely to the plate 1 by straps 5. The projecting end portion of the bolt 4 is preferably covered with any suitable flexible or resilient material indicated at 6 to form a cushion which will not mar the finish of the spokes of the wheel when the bolt 4 is projected between two adjacent spokes of the wheel to prevent rotation of the latter.

The means for operating the bolt 4 comprises a bell crank lever 7 which is pivotally mounted at 8 on an angular extension or bracket arm 9 extending forwardly from the plate 1. One arm of said lever 7 is connected by a link 10 to the adjacent end of the bolt 4 and the other arm of said lever is provided with a terminal eye 11 through which is slidingly mounted the rear end portion of a bolt operating rod 12. At its rear end the bolt 12 has a head 13 and between the head 13 and the eye 11 of the bell crank lever 7 there is interposed a bolt thrust spring 14. In case the extremity of the bolt 4 should come in contact with a spoke, the spring 14 will yield to allow the initial members of the bolt operating mechanism to be actuated and locked by the means hereinafter described; then as soon as the wheel starts to turn, the spring 14 acts to thrust the projecting end of the bolt 4 between two of the spokes of the wheel.

At its forward extremity the rod 12 is pivotally connected to a two-armed lever 15 which is mounted pivotally on a supporting arm or bracket 16 fixedly attached to and projecting from the front of the dash 17. Connected to the other arm of the lever 15 is a rod 18 which extends through the dash 17 and along the steering column 19 where it passes through one or more guides 20 fastened to the steering column. The rod 18 has at a suitable point in the length thereof a hand grip 21 which the operator grasps and draws toward him when he desires to project the bolt 14 into engagement with the wheel spokes. Hingedly connected to the upper extremity of the rod 18 is a hasp 22 formed with an eye to receive a pad-lock 23. The hasp 22 is so arranged that when the handle 21 is pulled toward the hand controlling wheel 24 on the upper rear end of the steering shaft in the column 19, the hasp 22 may be brought into engagement with one of the spokes of the wheel 24 and then locked by means of the pad-lock 23.

From the foregoing description taken in connection with the accompanying drawings it will now be understood that the locking device as a whole, herein shown and described, not only provides for locking one of the driving wheels of the machine by forcing a bolt into positive engagement with one of the spokes thereof, but at the same time the device serves to lock the hand wheel 24 and thereby prevent the steering wheels of the machine from turning from any angular position in which they may have been left by the operator of the vehicle.

I claim:—

1. An automobile locking device embodying, in combination, a bolt adapted to be projected between adjacent spokes of one of the carrying wheels of the vehicle, guiding means for said bolt adapted to be fastened to the vehicle axle, a bell-crank lever, a support on which said lever is pivotally mounted, a link connecting one arm of said lever with said bolt, the other arm of said lever being formed with an eye, a bolt operating rod having an end portion thereof slidable through said eye and provided at the extremity thereof with a head, a bolt thrust spring surrounding said rod between the head thereof and said eye, a hand control rod extending along the steering column, guiding means for the last named rod carried by said steering column, a lever interposed between and connected with both of said rods, and means for locking the last named rod to the hand control wheel of the vehicle.

2. An automobile locking device embodying, in combination, a bolt adapted to be projected between adjacent spokes of one of the carrying wheels of the vehicle, guiding means for said bolt adapted to be fastened to the vehicle axle, a bell-crank lever, a support on which said lever is pivotally mounted, a link connecting one arm of said lever with said bolt, the other arm of said lever being formed with an eye, a bolt operating rod having an end portion thereof slidable through said eye and provided at the extremity thereof with a head, a bolt thrust spring surrounding said rod between the head thereof and said eye, a hand control rod extending along the steering column, guiding means for the last named rod carried by said steering column, a lever interposed between and connected with both of said rods, means for locking the last named rod to the hand control wheel of the vehicle, said locking means comprising a hasp having a hinged connection with the last named rod and adapted to engage one of the spokes of the hand control wheel, and a lock proper for fastening said hasp to said spoke of the hand control wheel.

In testimony whereof I affix my signature.

JOHN E. DUGGAN.

Copies of this patent may be obtained for five cents each, by addressing the "Commissioner of Patents, Washington, D. C."